United States Patent
Knaappila

(10) Patent No.: US 10,200,202 B2
(45) Date of Patent: Feb. 5, 2019

(54) METHOD AND TECHNICAL EQUIPMENT FOR SHORT RANGE DATA TRANSMISSION

(71) Applicant: Silicon Laboratories Finland OY, Espoo (FI)

(72) Inventor: Jere Knaappila, Evitskog (FI)

(73) Assignee: Silicon Laboratories Finland OY, Espoo (FI)

(*) Notice: Subject to any disclaimer, the term of this patent is extended or adjusted under 35 U.S.C. 154(b) by 69 days.

(21) Appl. No.: 14/977,020

(22) Filed: Dec. 21, 2015

(65) Prior Publication Data

US 2016/0183090 A1 Jun. 23, 2016

(30) Foreign Application Priority Data

Dec. 23, 2014 (FI) .................................... 20146146

(51) Int. Cl.
*H04L 29/06* (2006.01)
*H04L 9/32* (2006.01)
(Continued)

(52) U.S. Cl.
CPC .......... *H04L 9/3271* (2013.01); *H04L 9/3273* (2013.01); *H04L 63/0435* (2013.01); *H04L 63/0869* (2013.01); *H04W 12/06* (2013.01); *H04W 4/005* (2013.01); *H04W 4/70* (2018.02); *H04W 12/04* (2013.01)

(58) Field of Classification Search
None
See application file for complete search history.

(56) References Cited

U.S. PATENT DOCUMENTS 6,377,691 B1 * 4/2002 Swift ............... H04L 63/04
380/277
2004/0015689 A1 1/2004 Billhartz
(Continued)

FOREIGN PATENT DOCUMENTS

EP 1631036 S2 8/2005
EP 2574089 A1 9/2012
(Continued)

OTHER PUBLICATIONS

Authors: Bluetooth Special Interest Group (SIG); "Bluetooth Core Specification Version 4.2"; Date: Dec. 2, 2014; pp. 16-19, 44-45, 274-276, and 1329.*

(Continued)

*Primary Examiner* — Eleni A Shiferaw
*Assistant Examiner* — Andrew J Steinle
(74) *Attorney, Agent, or Firm* — Egan Peterman Enders Huston

(57) ABSTRACT

The invention relates to a method for a communication system comprising a first device and a second device. The method comprises transferring a packet from a first device to a second device, which packet comprises an authentication request having a challenge; encrypting the challenge from the authentication request by the second device; including the determined challenge as a challenge-response to a response packet by the second device; sending the response packet from the second device to the first device; determining whether the challenge matches with the challenge-response, and if so, authenticating the second device.

31 Claims, 6 Drawing Sheets

(51) Int. Cl.
*H04W 12/06* (2009.01)
*H04W 4/70* (2018.01)
*H04W 4/00* (2018.01)
*H04W 12/04* (2009.01)

(56) References Cited

U.S. PATENT DOCUMENTS

2010/0037308 A1* 2/2010 Lin .................... H04B 7/18593
    726/12
2014/0378057 A1* 12/2014 Ramon ..................... H04L 9/32
    455/41.2

FOREIGN PATENT DOCUMENTS

WO    WO2006/036521 A1    4/2006
WO    WO2008/091410 S2    7/2008
WO    WO2009/103621 A1    8/2009

OTHER PUBLICATIONS

Search Report, FI20146146, dated Jul. 9, 2015, 2 pg.
Liang et al., "On Performance Analysis Of Challenge/Response Based Authentication In Wireless Networks", Elsevier, Computer Networks, 2004, 22 pgs.
Bluetooth, Specification of The Bluetooth System, Version 4.2, vol. 1, Part A, 2014, 7 pgs.
Bluetooth, Specification of The Bluetooth System, Version 4.2, vol. 2, Part C, 2014, 5 pgs.
Bluetooth, Specification of The Bluetooth System, Version 4.2, vol. 6, Part B, 2014, 6 pgs.
Bluetooth, Bluetooth Low Energy, Printed from Internet Sep. 20, 2017, 11 pgs.
Bluetooth, Specification of the Bluetooth System, Version 4.2, vol. 2, Part C, 2014, 2 pgs.
Bluetooth, Specification of the Bluetooth System, Version 4.2, vol. 2, Part B, 2014, 18 pgs.

* cited by examiner

METHOD AND TECHNICAL EQUIPMENT FOR SHORT RANGE DATA TRANSMISSION

This application claims priority to co-pending Finnish patent application serial number 20146146 filed on Dec. 23, 2014, the disclosure of which is incorporated herein by reference in its entirety for all purposes.

TECHNICAL FIELD

The present application relates to BLUETOOTH Low Energy (BLE). In particular, the present application relate to authentication of BLE devices.

BACKGROUND

BLUETOOTH Low Energy (BLE) relates to BLUETOOTH wireless radio technology. BLE has been designed for low-power and low latency applications for wireless devices within short range.

The difference between BLE and classic BLUETOOTH is that the BLE devices consume remarkably less power for communication than classic BLUETOOTH devices. In addition, the data transmission can be started more fast in the BLE than in the classic BLUETOOTH. This makes it possible to have BLE devices constantly on and to communicate intermittently with other devices.

SUMMARY

Now there has been invented an improved method and technical equipment implementing the method, by which authentication procedure of BLE devices can be improved. Various aspects of the invention include a method, an apparatus, a server, a client and a computer readable medium comprising a computer program stored therein, which are characterized by what is stated in the independent claims. Various embodiments of the invention are disclosed in the dependent claims.

According to a first aspect, there is provided a method for a communication system comprising a first device and a second device, comprises transferring a packet from a first device to a second device, which packet comprises an authentication request having a challenge; encrypting the challenge from the authentication request by the second device; including the determined challenge as a challenge-response to a response packet by the second device; sending the response packet from the second device to the first device; determining whether the challenge matches with the challenge-response, and if so, authenticating the second device.

According to an embodiment, the first device is one of the following group: an advertising device, a scanning device or an initiator.

According to an embodiment, the second device is one of the following group: an advertising device, a scanning device or an initiator; and different from the first device.

According to a second aspect, there is provided a method for a first device, comprising: transferring a packet to a second device, which packet comprises an authentication request having a challenge; receiving a response packet from the second device, which response packet comprises a challenge-response; determining whether the challenge matches with the challenge-response, and if so, authenticating the second device.

According to a third aspect, there is provided a method for a second device, comprising receiving a packet from a first device, which packet comprises a challenge; encrypting the challenge from the received packet; including the determined challenge as a challenge-response to a response packet; sending the response packet to the first device.

According to an embodiment, the method comprises encrypting the challenge with a preshared key.

DESCRIPTION OF THE DRAWINGS

In the following, various embodiments of the invention will be described in more detail with reference to the appended drawings, in which.

DESCRIPTION OF EXAMPLE EMBODIMENTS

Figure 1:
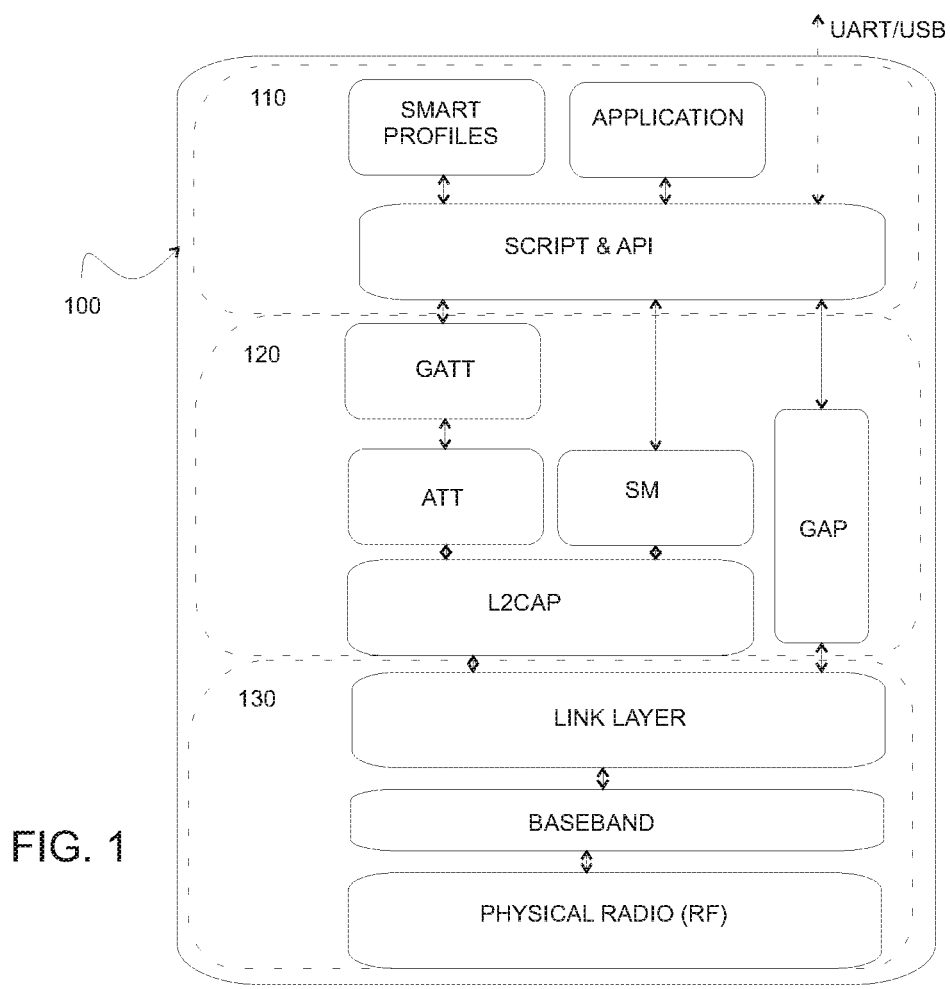
FIG. 1 shows a BLUETOOTH module according to an embodiment.

FIG. 1 illustrates an example of an electronic apparatus 100. According to an embodiment, the apparatus 100 is a BLUETOOTH module that comprises an application layer 110, a host layer 120 and a BLE controller 130. The application layer 110 comprises the apparatus related application(s) (e.g. heart rate, proximity, blood pressure, time update, temperature, battery, . . . ), smart profiles, script and application programming interface (API). The application is capable of reading sensor data e.g. from heart rate sensor, and reporting the data to host layer for transmitting the data by means of the BLE controller 130. The host layer 120 comprises protocols running over the connection. The host layer 120 also comprises data to be used in advertisement packet. In FIG. 1, the host layer 120 is shown to comprise a generic attribute profile (GATT), a generic access profile (GAP), an attribute protocol (ATT), a security manager (SM) and a logical link control and adaptation protocol (L2CAP). The BLE controller 130 comprises a link layer, a baseband layer and a physical layer (i.e. a physical radio, radio frequency RF). The link layer provides ultra-low power idle mode operation and a device discovery (i.e. connection mode and advertising mode handling). The link layer is also in charge for packet transmission and responding.

Figure 2:
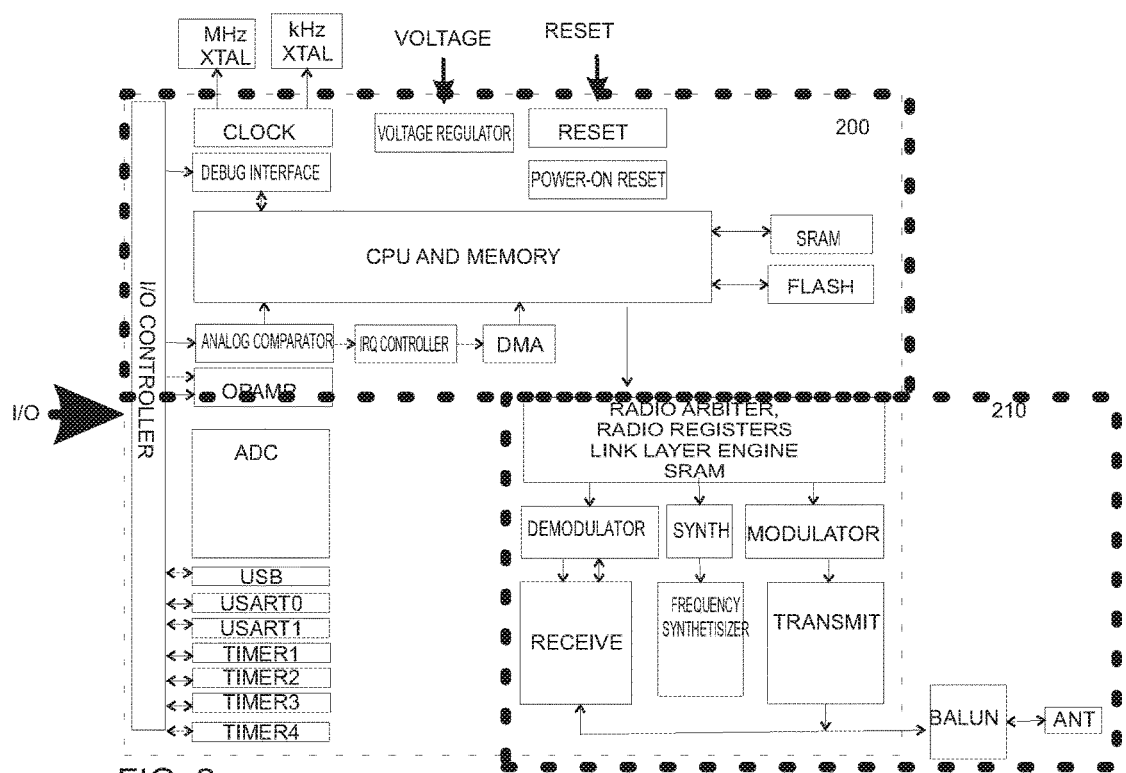
FIG. 2 shows a simplified block chart of a Bluetooth module.

FIG. 2 illustrates an example of a BLE module available on the market as a simplified block diagram. A central processing unit and memory means with application data are located in a segment 200. A part of the link layer and a physical layer are illustrated with reference 210. The segment 210 comprises elements, such as radio registers, a link layer engine, a modulator-demodulator, receiving-transmitting means, a frequency synthesizer, a balancing-unbalancing unit (balun), an antenna (and). The segment 210 is a detailed illustration of the element "physical radio (RF)" 135 in FIG. 1. The segment 200 on the other hand is a detailed illustration of the layers 110-130 in FIG. 1 without the element "physical layer (RF)" 135.

Today, BLE related applications can be found from healthcare, fitness, security, smart energy, industrial automation and home entertainment. BLE is not limited only those, but increasingly more new applications utilizing BLE technology are designed.

In BLE technology, following terminology is used. An advertising device (i.e. an advertiser) is a device that is configured to send advertisement packets and scan response (i.e. SCAN_RSP) packets. To let the other devices to know about the advertising devices, the advertising devices periodically pass advertisement packets which a scanning device is able to scan. A scanning device (i.e. a scanner) is a device that is configured to send scan request (i.e. SCAN_REQ) packets as a response to advertising packets. An initiator is a device that is configured to send connection request (i.e. CONNECT_REQ) packets to an advertiser. When an initiator (or a scanner) connects to an advertiser, the advertiser will be called "a slave" and the scanner will be called "a master". A number of slave devices can be connected to a master device. The master device is also able to communicate with one or more slave device, also simultaneously.

The state for passing advertisement packets is called "an advertising state", and the state for connection is called "a connected state". In both states, data transfer occurs. A slave device may be a sensor or an actuator, such as a temperature sensor, a heart rate sensor, a light bulb, a proximity sensor etc. A master device can be any electronic device capable of collecting data, e.g. a mobile phone, a smart phone, a personal digital assistant, a personal computer, a laptop computer, a tablet computer, etc.

Advertisement packet types from an advertising apparatus are:
ADV_IND connectable undirected advertising event
ADV_DIRECT_IND connectable directed advertising event
ADV_NONCONN_IND non-connectable undirected advertising event
ADV_SCAN_IND scannable undirected (non-connectable) advertising event If the advertising device sends either the ADV_IND or ADV_DIRECT_IND packets, an initiator desiring to exchange data with the advertising device can send a CONNECT_REQ packet. If the advertising device accepts the CONNECT_REQ packet, the device become connected and the communication may be started.

CONNECT_REQ packet contains data on transmit window size timing window for the first data packet, transmit window offset that is off when the transmit window starts, connection interval is the time between connection events, slave latency defines number or times the slave can ignore connection events from the master, connection timeout is maximum time between two correctly received packets in the connection before link is considered to be lost, hop sequence is a random number appointing the starting point for a hop, channel map, CRC (Cyclic Redundancy Check) initialization value.

Instead of the CONNECT_REQ, a scanning device may also response to advertising packets with SCAN_REQ packet, which is a request for the advertising device to send further information. The advertising device may give more information to the scanning device by SCAN_RSP packet. SCAN_RSP packet may contain information on the name of the advertising device and on the services the advertising device is able to provide.

However, SCAN_RSP packet is not limited to carry only this information, but may contain other data as well or instead.

Packets sent from a slave device in advertising mode contains approximately 27 bytes of data and a slave address. Packets from master device in advertisement channel contains only a master address.

BLE comprises a concept of pairing which is a procedure by which devices generate and distribute key material. When the devices are connected, they first agree on a temporary key, which may be a six numeric digits delivered between the devices. Based on the temporary key and on random numbers generated by each pairing devices, a short-term key is obtained by both devices. Finally, each connected device may distribute a long-term key with a connection signature resolving key and identity resolving key. The long-term key (referred as a preshared key in this description) is employed for the link layer encryption and authentication.

It is appreciated that in BLE connections must be formed in order to authenticate the remote end (e.g. the advertiser or the scanner or the initiator). This slows the authentication procedure and may not be possible if either device (i.e. the scanner or the advertiser) is already connected.

The present embodiments provide a solution, by means of which authentication is possible without a connection. This can be implemented by including an authentication request to a transferable packet from a sending device to a receiving device. The authentication request comprises a challenge (e.g. a new address being generated for the sending device), which is encrypted from the authentication request by the receiving device. The receiving device includes the encrypted challenge to the packet that will then be send as a response to the authentication request. The sending device validates the challenge that is received from the receiving device, and thus authenticates the receiving device. The sending device may be an advertising device, a scanning device or an initiator. The receiving device may be an advertising device, a scanning device or an initiator, but different than then sending device.

Figure 3:
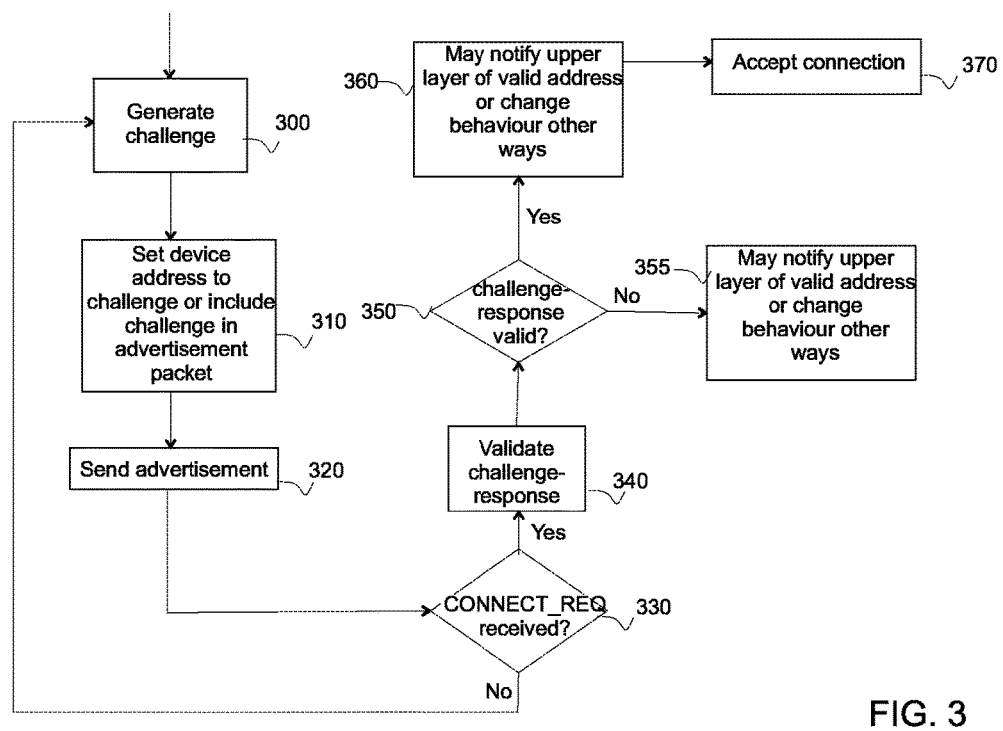
FIG. 3 shows an example of a method for an advertising device according to an embodiment.

An embodiment of the invention is illustrated in FIG. 3. This embodiment describes the situation from advertising device's point of view, where the advertising device sends an authentication request. The operation begins when the advertising device generates the authentication request 300. The advertising device may set device address to be a challenge 310, whereby the challenge will be sent as an authentication request. Alternatively, the advertising device may include the challenge (i.e. an address of the advertising device) in an advertising packet 310, e.g. in ADV_IND packet payload, wherein the advertising packet will be sent as an authentication request. If the device address is set as challenge, and the challenge is sent as an authentication request, the ADV_IND packet may be used normally. Instead, the ADV_IND packet may comprise information that the challenge request is transmitted in the address.

When the advertisement packet is ready, the advertising device sends the advertisement packet 320. An initiator detects the packet and encrypts the challenge from the advertising packet. In addition, the initiator generates a connection request and includes the encrypted challenge in the connection request. When the connection request is ready, the initiator sends the CONNECT_REQ to the advertising device. In this operation, the advertising device receives the connection request CONNECT_REQ 330 from the initiator, wherein the connection request comprises the encrypted challenge. The challenge should match the advertiser device's address being included in the authentication request in step 300, 310. If the connection request is not received, the advertising device continues generating a new challenge 300.

The advertising device validates the challenge from the received CONNECT_REQ packet 340. If the challenge is not valid (i.e. the address does not match), the advertising device may send a notification to an upper layer or change its behavior in other way 355. Similarly, if the challenge is valid, the advertising device may notify an upper layer or change its behavior in other way 360 and accepts connection 370.

Figure 4:
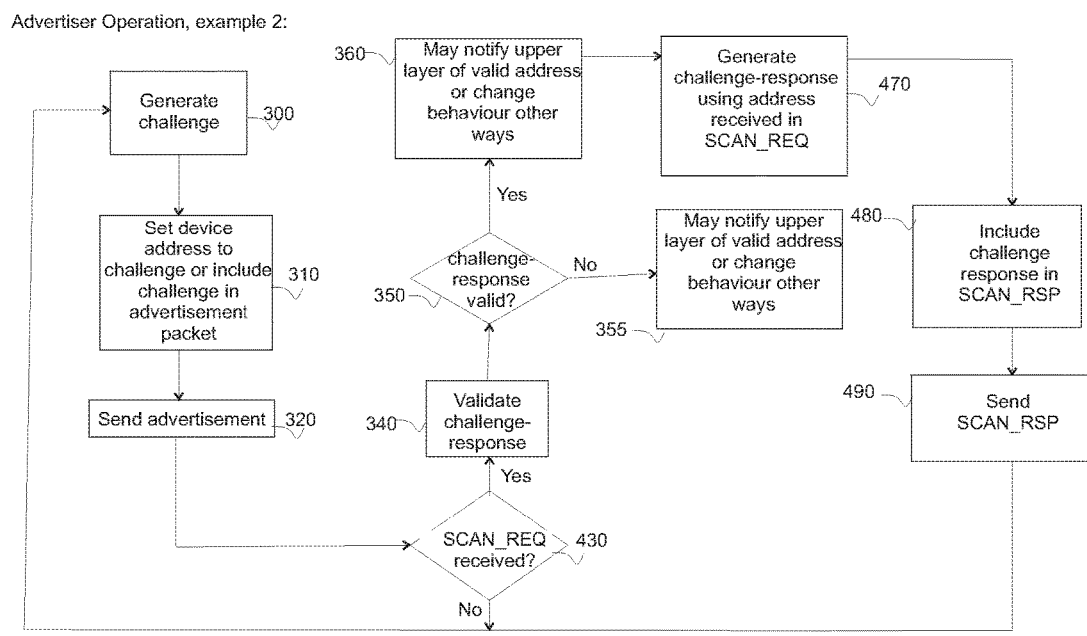
FIG. 4 shows an example of a method for an advertising device according to another embodiment.

Another embodiment of the invention is illustrated in FIG. 4. Also this embodiment describes the situation from advertising device's point of view. The operation begins when the advertising device generates the authentication request 300. The advertising device may set device address to be a challenge 310, whereby the device address will be sent as an authentication request. Alternatively, the advertising device may include the challenge (i.e. an address of the advertising device) in an advertising packet 310, e.g. in ADV_IND packet payload. If the device address is set as challenge, and the challenge is sent as an authentication request, the ADV_IND packet may be used normally. Instead, the ADV_IND packet may comprise information that the challenge request is transmitted in the address.

When the advertisement packet is ready, the advertising device sends the advertisement packet 320. A scanning device detects the advertising packet and encrypts the challenge from it. In addition, the scanning device generates a scan request and includes the encrypted challenge (as a challenge response) in the scan request. When the scan request is ready, the scanning device sends the SCAN_REQ to the advertising device. In this operation, the advertising device receives the scan request SCAN_REQ 430 comprising the challenge response from a scanning device. The challenge response should match the advertiser device's address being included to the authentication request in step 300, 310. If the scan request is not received, the advertising device continues generating a new challenge 300.

The advertising device is configured to validate the challenge response from the received scan request 340. If the challenge response is valid 350, the advertising device may notify an upper layer or change its behavior in other way 360. Then the advertising device generates a further challenge response from advertising device's point of view by using the address received in the SCAN_REQ 470. This further challenge response is included in a scan response SCAN_RSP 480, particularly in packet payload, and the scan response is then send 490 to the scanning device.

However, if the challenge response from the scanning device is not valid (i.e. the address does not match), the advertising device may send a notification to an upper layer or change its behavior in other way 355.

Figure 5:
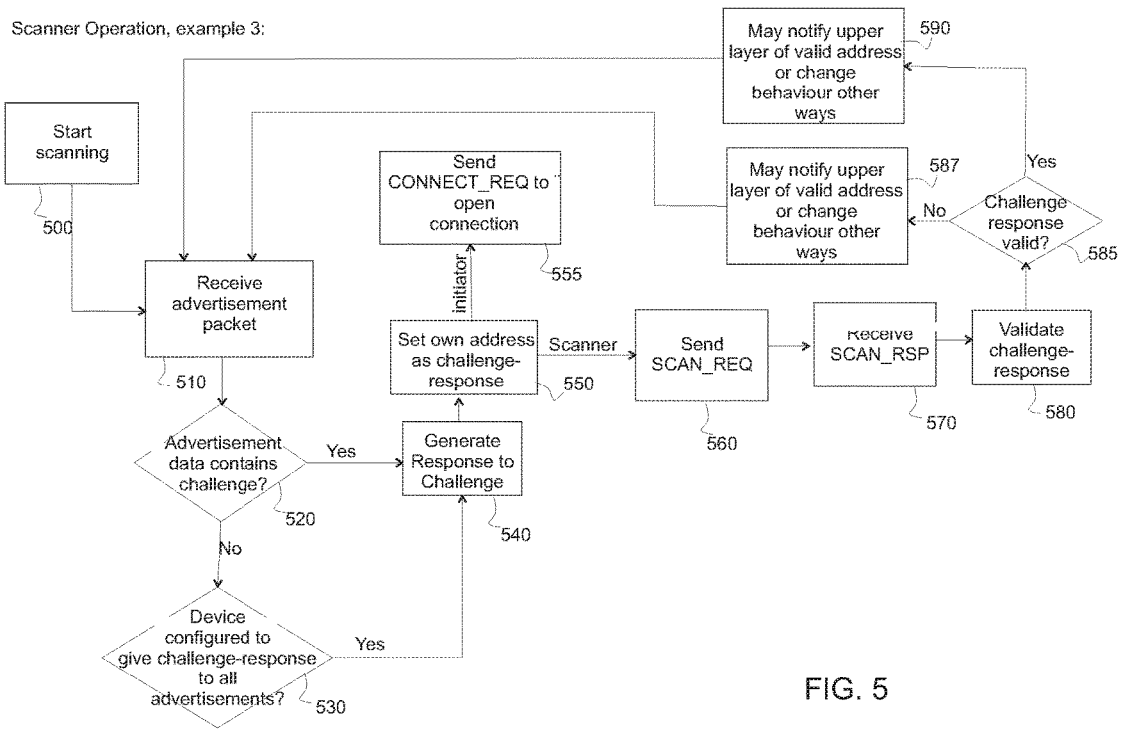
FIG. 5 shows an example of a method for a scanning device according to an embodiment.

Another embodiment of the invention is illustrated in FIG. 5. This embodiment describes the operation from scanning device's point of view.

According to this embodiment, the scanning device starts scanning 500 for advertising devices, i.e. scans for advertising packets from advertising devices. When an advertising device is found, the scanning device receives an advertisement packet 510 from the advertising device. The scanning device determines whether or not the advertisement packet contains a challenge 512. If not, it is determined whether the scanning device is configured to transmit challenges to all advertisement packets 530. If the scanning device is configured to transmit challenge to all advertisement packets, or whether it was determined (at step 520) that the received advertisement contained a challenge, a response (i.e. a challenge response) to the challenge is generated 540. The scanning device sets its own address as the challenge response 550 to be included in the following CONNECT_REQ or SCAN_REQ packet.

If the scanning device acts as an initiator, the scanning device is configured to send CONNECT_REQ in order to open a connection 555. If the scanning device acts as a scanner, the scanning device sends a SCAN_REQ 560. As a response the SCAN_REQ packet, the scanning device receives a SCAN_RSP packet 570 from an advertising device, from which a challenge response (i.e. address of the scanning device) is validated 580. If the challenge response is valid 585, the scanning device may notify upper layer of the valid address or changes its behavior in other way 590. Similarly, if the address is not valid, the scanning device may notify upper layers of the valid address or changes behavior in other way 587. The operation may continue by receiving next advertising packet 510.

Figure 6:
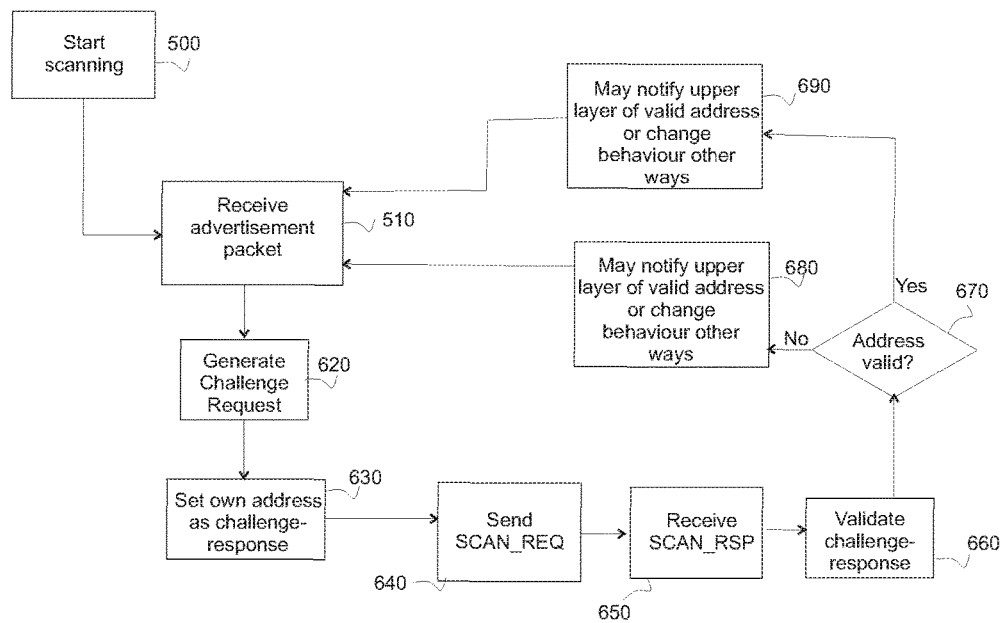
FIG. 6 shows an example of a method for a scanning device according to another embodiment.

Yet another embodiment of the invention from scanning device's point of view is illustrated in FIG. 6. According to this embodiment, the scanning device starts scanning 500 for advertising devices, i.e. scans for advertising packets from advertising devices. When an advertising device is found, the scanning device receives an advertisement packet 510 from the advertising device. As a response to the received advertisement packet, the scanning device generates an authentication request 620 and sets its own address as challenge to the authentication request 630. Then, the scanning device sends a SCAN_REQ 640, which contains the challenge. As a response the SCAN_REQ packet, the scanning device receives a SCAN_RSP packet 650 from an advertising device. The SCAN_RSP should include the challenge (as challenge response) encrypted by the advertising device from the SCAN_REQ. The scanning device validates the challenge (i.e. the address of the scanning device) from the SCAN_RSP packet 660. If the address is valid 670, the scanning device may notify upper layer of the valid address or changes its behavior in other way 690. Similarly, if the address is not valid, the scanning device may notify upper layers of the valid address or changes behavior in other way 680. The operation may continue by receiving next advertising packet 510.

In the above embodiments, a term "challenge" was used to describe an address of a device. The challenge may be generated at a link layer of the device. Alternatively, the challenge may be generated at upper layers, e.g. at host layer (FIG. 1: 120). Depending on the embodiment, the challenge may be included either in an advertising packet or in a scan request packet or in a connection request packet.

When a device (i.e. a scanning device or an advertising device, depending on the embodiment) receives an authentication request packet from another device (i.e. an advertising device or a scanning device, depending on the embodiment), which packet comprises a challenges, the device (for example the link-layer) is configured to encrypt the new address from the packet with a preshared key and add the encrypted address to a response packet to be delivered as a response to the other device. The preshared key is common to the devices. The preshared key may have been delivered over a former connection from one of the devices to the other. The former connection may have been a BLUETOOTH connection or any other short or long range wired or wireless connection. Instead, the preshared key may have been received from a third device. Similarly, the step for validating an address/challenge-response, the preshared key may be used.

The previous embodiments (shown in FIGS. 3-4 and in FIGS. 5-6) can be combined.

For example, when an advertising device is advertising a challenge according to FIG. 3, and an initiator is configured to send a challenge-response (i.e. the determined challenge in a CONNECTION_REQ packet) to an advertisement packet according to FIG. 5, the result is that the initiator is authenticated for the advertising device, i.e. the advertising device validates the challenge-response from the initiator, as shown in FIG. 3.

As an another example, when an advertising device is advertising a challenge according to FIG. 3 and the scanning device is configured to send a challenge-response (i.e. the determined challenge in a SCAN_REQ packet) to an advertisement packet according to FIG. 5, the result is that the scanning device is authenticated for the advertising device.

Yet as a further example, when an advertising device is advertising a challenge according to FIG. 3, and the scanning device is configured to send a challenge request to an advertisement packet according to FIG. 6, the result is that there is no authentication.

Yet as a further example, when a scanning sends a SCAN_REQ containing a challenge as a response to an advertisement, as shown in FIG. 5, and an advertising device sends challenge-response (i.e. determined challenge) in SCAN_RSP packet, as shown in FIG. 4, the advertising will be authenticated to a scanning device, i.e. the scanning device validates the challenge from the advertising device, as shown in FIG. 5.

Yet as a further example, when an initiator scanning sends a CONNECTION_REQ containing a challenge as a response to an advertisement, as shown in FIG. 6, and an advertising device sends challenge response (i.e. determined challenge) in SCAN_RSP packet, as shown in FIG. 3, there will not be an authentication.

Yet as a further example, when a scanning sends a SCAN_REQ containing a challenge as a response to an advertisement, as shown in FIG. 6, and an advertising device sends challenge response in SCAN_RSP packet, as shown in FIG. 4, the advertising device will be authenticated to a scanning device, i.e. the scanning device validates the challenge-response from the advertising device, as shown in FIG. 6.

Yet in a further example, an advertising device is advertising and sends challenge-response (determined challenge from a SCAN_REQ packet) in SCAN_RSP (combined implementation of FIGS. 3 and 4). In such a situation, the scanner may send a response to advertisement, as shown in FIG. 5, whereby both devices (i.e. a scanner and an advertiser) are authenticated to each other. Alternatively, in such a situation, a scanner may send a request (SCAN_REQ) to an advertiser, as shown in FIG. 6, whereby an advertising device is authenticated to the scanning device. Yet, as further alternative, if an initiator sends a request (i.e. CONNECT_REQ) to the advertisement, as shown in FIG. 5, the initiator is authenticated to the advertising device.

In the present embodiments, the challenge (i.e. created new address) sent over the air must never use the same value that has been used before. Thus, the device should use a good random number generator for generating the challenge. Instead of random number generator, a counter may be used. However, the output of the counter must be encrypted, and the current position of the counter must be saved each time the number is sent over the air. It is important to have the address changed for each packet, because this removes possibility of replay attack by relaying the address to remote site.

The device address has $2^{46}$ bits which allows around 70 trillion different challenges before wrapping around. If—for example—a scanning device scans 100 advertisers each second, it would take 22 thousands years before all the possible addresses have been used. Therefore, replay attack is unlikely if enough care has been taken in generating challenge bit-sequence.

An example of the scanning device is a lock, whereas an example of the valid advertising device is a key suitable for the lock in question. However, all kinds of devices which needs authentication can be used with this invention. "Key" can be watch, phone or car key. "Lock" can be car, computer, door.

The present embodiments may be utilized to prevent relay station attacks, by using the time of receiving a packet for estimating a distance. In general, the signal strength of a received packet is used for estimating a distance. This means that a door is not opened if a mobile device used as a key is farther than e.g. 1 meter from the lock. However, in some situations, signal strengthener can be used to change the actual distance estimation. Such a method is utilized by burglars. This can be prevented by using a time of receiving a packet. The speed of a radio wave is the same as the speed of light (i.e. 300 000 km/sec). Thus the distance the signal can travel back and forth with greatest speed in one microsecond is 150 meters. According to an embodiment, the packets containing the challenge must be sent exactly at 150 microseconds. This makes it possible for the receiving device to determine the distance to the sending device based on the time between the received packet and the packet being sent. This can be used for determining whether or not there has been an attack between the packets.

The various embodiments may provide advantages. For example, the present embodiments provide a faster authentication procedure and possible even if either device is already connected to another device. Because no connection is needed for performing the authentication, a device that supports only single connection at a time can still be used for authentication. For example, if a phone is connected to a watch, by the present embodiments, the watch can still be used to authenticate a lock.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment.

It is obvious that the present invention is not limited solely to the above-presented embodiments, but it can be modified within the scope of the appended claims.

The invention claimed is:

1. A method for a first device, comprising operating the first device in a master to slave connection or a slave to master connection with a second wireless device; and performing the following steps without opening the master to slave connection or the slave to master connection between the first device and the second device:
   transferring a packet to a second device, which packet comprises an authentication request having a challenge that is the address of the first device;
   then receiving a response packet from the second device, which response packet comprises a challenge-response that is the first device address encrypted;
   then determining whether the first device address of the challenge matches with the first device address of the challenge-response; and if so, authenticating the second device without opening the master to slave connection or the slave to master connection between the first device and the second device; and then allowing the second device for master to slave operation or slave to master operation with the first device and/or to exchange scan response data or scan request data with the first device only upon completion of the authenticating of the second device.

2. The method according to claim 1, wherein the first device is an advertising device, where the challenge is the address of the advertising advice, and where the packet is an advertising packet that includes the challenge.

3. The method according to claim 1, wherein the first device is a scanning device, where the challenge is the address of the scanning device, and where the packet is a scan request packet that includes the challenge.

4. The method according to claim 1, wherein the first device is an initiator, where the challenge is the address of the initiator, and where the packet is a connection request packet that includes the challenge.

5. The method according to claim 1, wherein the device address of the packet is set as the challenge.

6. The method according to claim 1, further comprising authenticating the second device at the same time that at least one of the first device or second device is already connected in a master to slave connection or slave to master connection with another device.

7. The method according to claim 1, further comprising authenticating the second device at the same time that the first device is already connected in a master to slave connection or slave to master connection with another device; and where the first device only supports a single master to slave connection or slave to master connection at a time.

8. The method according to claim 1, wherein the first device is a short range communication device; and where the second device is a short range communication device.

9. The method according to claim 5, wherein the device address of the response packet is set as the challenge response.

10. The method according to claim 1, wherein the address of the first device is changed for each packet comprising an authentication request having a challenge.

11. The method according to claim 2, where the challenge is an address of the advertising device; and where the method further comprises sending the advertising packet with the challenge as an authentication request in which either one of:
the advertising device address of the advertising packet is set to be the challenge by the advertising device; or
where the address of the advertising device is included as the challenge in the payload of the advertising packet by the advertising device.

12. The method according to claim 11, where the advertising device address of the advertising packet is set to be the challenge by the advertising device; and where the advertising packet further comprises information indicating to the second device that the challenge is being transmitted in the advertising device address of the advertising packet.

13. The method according to claim 3, where the second device is an advertising device and the response packet is a scan response packet; and where the method further comprises:
scanning for advertising packets from advertising devices;
responding to the receipt of an advertising packet from the advertising device by setting the address of the scanning device within the scan request packet to be the challenge;
transferring the scan request packet to the advertising device; and
receiving the scan response packet including the challenge-response from the advertising device.

14. The method according to claim 4, where the second device is an advertising device and the response packet is a scan response packet; and where the method further comprises:
scanning for advertising packets from advertising devices;
responding to the receipt of an advertising packet from the advertising device by setting the address of the initiator device within the connection request packet to be the challenge; and
transferring the connection request packet to the advertising device.

15. The method according to claim 1, where the first device comprises a lock device and the second device comprises a key device; or where the first device comprises a key device and the second device comprises a lock device.

16. A method for a second device, comprising operating the second device in a master to slave connection or a slave to master connection with a second wireless device; and performing the following steps without opening the master to slave connection or slave to master connection between the first device and the second device:
receiving a packet from the first device, which packet comprises a challenge that is an address of the first device;
then encrypting the first device address of the challenge from the received packet;
including the encrypted first device address as a challenge-response in a response packet; and
sending the response packet to the first device; and
then operating in master to slave relationship or slave to master relationship with the first device and/or exchanging scan response data or scan request data with the first device only upon completion of authentication of the second device by the first device based on the response packet.

17. A method according to claim 16, further comprising encrypting the first device address of the challenge with a preshared key.

18. The method according to claim 16, wherein the second device is one of the following group: an advertising device, a scanning device or an initiator; and where the second device is different from the first device.

19. The method according to claim 16, further comprising sending the response packet to the first device at the same time that at least one of the first device or second device is already connected in a master to slave connection or slave to master connection with another device.

20. The method according to claim 16, further comprising sending the response packet to the first device at the same time that the second device is already connected in a master to slave connection or slave to master connection with another device; and where the second device only supports a single master to slave connection or slave to master connection at a time.

21. The method according to claim 16, wherein the device address of the packet is set as the challenge.

22. The method according to claim 16, wherein the address of the first device is changed for each packet comprising a challenge.

23. The method according to claim 16, wherein the first device is a short range communication device; and where the second device is a short range communication device.

24. The method according to claim 16, where the device address of the response packet is set as the challenge response.

25. A sending apparatus comprising a processor and memory, wherein the sending apparatus is configured to operate in a master to slave connection or a slave to master connection with a receiving device; and wherein the sending apparatus is configured to operate as follows without opening the master to slave connection or the slave to master connection between the sending apparatus and the receiving device:
   transfer a packet to a receiving device, which packet comprises an authentication request having a challenge that is the address of the sending apparatus;
   then receive a response packet from the receiving device, which response packet comprises a challenge-response that is the sending apparatus address encrypted;
   then determine whether the sending apparatus address of the challenge matches with the challenge-response, and if so,
   authenticate the receiving device without opening the master to slave connection or the slave to master connection between the sending apparatus and the receiving device, and
   then allow the receiving device for master to slave operation or slave to master operation with the sending apparatus and/or for exchange of scan response data or scan request data with the sending apparatus only upon completion of the authentication of the receiving device.

26. The sending apparatus according to claim 25, wherein the sending apparatus is a short range communication device.

27. The sending apparatus of claim 25, where the sending apparatus comprises a lock device and the receiving device comprises a key device; or where the sending apparatus comprises a key device and the receiving device comprises a lock device.

28. A receiving apparatus comprising a processor and memory, wherein the receiving apparatus is configured to operate in a master to slave connection or a slave to master connection with a sending device; and wherein the receiving apparatus is configured to operate as follows without opening the master to slave connection or the slave to master connection between the receiving apparatus and the sending device:
   receive a packet from the sending device, which packet comprises a challenge that is an address of the sending device;
   then encrypt the sending device address of the challenge from the received packet;
   include the encrypted sending device address as a challenge-response in a response packet;
   send the response packet to the sending device; and
   then operate in master to slave relationship or slave to master relationship with the sending device and/or to exchange scan response data or scan request data with the sending device only upon completion of authentication of the receiving apparatus by the sending device based on the response packet.

29. The receiving apparatus according to claim 28, wherein the receiving apparatus is a short range communication device.

30. A method for a first device, comprising operating the first device in a master to slave connection or a slave to master connection with a second wireless device; and performing the following steps without opening the master to slave connection or the slave to master connection between the first device and the second device:
   transferring a packet to a second device, which packet comprises an authentication request having a challenge that is the address of the first device;
   then receiving a response packet from the second device, which response packet comprises a challenge-response that is the first device address encrypted;
   then determining whether the first device address of the challenge matches with the first device address of the challenge-response, and if so,
   authenticating the second device without opening the master to slave connection or the slave to master connection between the first device and the second device;
   where the response packet is sent from the second device at 150 microseconds from a time of receipt of the packet transferred from the first device, the method further comprising:
   receiving the response packet from the second device,
   receiving the response packet including the challenge-response from the advertising device,
   determining the distance to the second device based on a time between transfer of the packet from the first device and receipt of the response packet from the second device, and
   authenticating the second device based on the determined distance to the advertising device.

31. A method for a first device, comprising operating the first device in a master to slave connection or a slave to master connection with a second wireless device; and performing the following steps without opening the master to slave connection or the slave to master connection between the first device and the second device:
   transferring a packet to a second device, which packet comprises an authentication request having a challenge that is the address of the first device;
   then receiving a response packet from the second device, which response packet comprises a challenge-response that is the first device address encrypted;
   then determining whether the first device address of the challenge matches with the first device address of the challenge-response, and if so,
   authenticating the second device without opening the master to slave connection or the slave to master connection between the first device and the second device;
   wherein the first device is a scanning device, where the challenge is the address of the scanning device, and where the packet is a scan request packet that includes the challenge; and
   where the second device is an advertising device and the response packet is a scan response packet sent by the advertising device at 150 microseconds from a time of receipt of the scan request packet; and where the method further comprises:
   scanning for advertising packets from advertising devices, responding to the receipt of an advertising packet from the advertising device by setting the address of the scanning device within the scan request packet to be the challenge, transferring the scan request packet to the advertising device, receiving the scan response packet including the challenge-response from the advertising device, determining the distance to the advertising device based on a time between transmission of the scan request packet and receipt of the scan response packet, and authenticating the advertising device based on the determined distance to the advertising device.

* * * * *

UNITED STATES PATENT AND TRADEMARK OFFICE
CERTIFICATE OF CORRECTION

PATENT NO.         : 10,200,202 B2
APPLICATION NO.    : 14/977020
DATED              : February 5, 2019
INVENTOR(S)        : Knaappila Page 1 of 1

It is certified that error appears in the above-identified patent and that said Letters Patent is hereby corrected as shown below:

In the Claims

In Claim 2, Column 9, Line 12, delete "advice" and insert --device--

Signed and Sealed this
Nineteenth Day of March, 2019

Andrei Iancu
*Director of the United States Patent and Trademark Office*